United States Patent
Koo et al.

(10) Patent No.: US 8,686,645 B2
(45) Date of Patent: Apr. 1, 2014

(54) LED PROTECTION CIRCUIT

(71) Applicant: LG Innotek Co., Ltd., Seoul (KR)

(72) Inventors: Gwan Bon Koo, Seoul (KR); Dong Keun Yoon, Seoul (KR); Jong Hyun Lee, Seoul (KR); Jin Woo Lee, Seoul (KR); Jae Beom Cho, Seoul (KR); Ji Woong Jo, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/662,168

(22) Filed: Oct. 26, 2012

(65) Prior Publication Data

US 2013/0106292 A1     May 2, 2013

(30) Foreign Application Priority Data

Oct. 28, 2011 (KR) ........................ 10-2011-0110995

(51) Int. Cl.
*H05B 37/02* (2006.01)

(52) U.S. Cl.
USPC ........................ 315/122; 315/307; 315/185 R (58) Field of Classification Search
USPC .............. 315/121, 122, 185 R, 224, 291, 307
See application file for complete search history.

(56) References Cited

U.S. PATENT DOCUMENTS

| | | | |
|---|---|---|---|
| 8,410,705 B2 * | 4/2013 | Bollmann et al. | ............ 315/119 |
| 2007/0258176 A1 * | 11/2007 | Ball et al. | ........................ 361/56 |
| 2009/0102399 A1 | 4/2009 | Kita | |
| 2009/0323238 A1 * | 12/2009 | Gehrke | ............................ 361/56 |
| 2010/0156324 A1 | 6/2010 | Nagase et al. | |
| 2011/0037407 A1 | 2/2011 | Ahn et al. | |
| 2011/0109231 A1 * | 5/2011 | Shiu et al. | ........................ 315/122 |
| 2012/0126703 A1 * | 5/2012 | Jung et al. | ........................ 315/122 |

FOREIGN PATENT DOCUMENTS

| | | |
|---|---|---|
| JP | 10-093143 A | 4/1998 |
| JP | 10-126238 A | 5/1998 |
| JP | 2006-269484 A | 10/2006 |
| JP | 2009-104848 A | 5/2009 |
| JP | 2009-284721 A | 12/2009 |
| JP | 2010-129612 A | 6/2010 |
| KR | 10-2009-0065848 A | 6/2009 |
| KR | 10-2011-0017784 A | 2/2011 |
| KR | 10-1064906 B1 | 9/2011 |

* cited by examiner

*Primary Examiner* — Don Le
(74) *Attorney, Agent, or Firm* — Birch, Stewart, Kolasch & Birch, LLP (57) ABSTRACT

Disclosed is an LED protection circuit using a one-shot vibrator. The LED protection circuit includes an LED module; an LED load-open detection circuit for detecting a voltage applied to the LED module to vary a reference potential; a latch circuit for maintaining a latch state according to the reference potential of the LED load-open detection circuit; a current limit circuit for receiving an output signal from the latch circuit to output a first signal; an LED load connection detection circuit for varying the reference potential through the first signal to output a second signal; a trigger input circuit connected to the LED load connection detection circuit for outputting a third signal using the second signal; and a one-shot vibrator for outputting a fourth signal of a square waveform during a predetermined time when the third signal is input.

14 Claims, 7 Drawing Sheets

LED PROTECTION CIRCUIT

BACKGROUND

The embodiment relates to a light emitting diode (LED) protection circuit, and more particularly, to an LED protection circuit using a one-shot vibrator.

Figure 1:
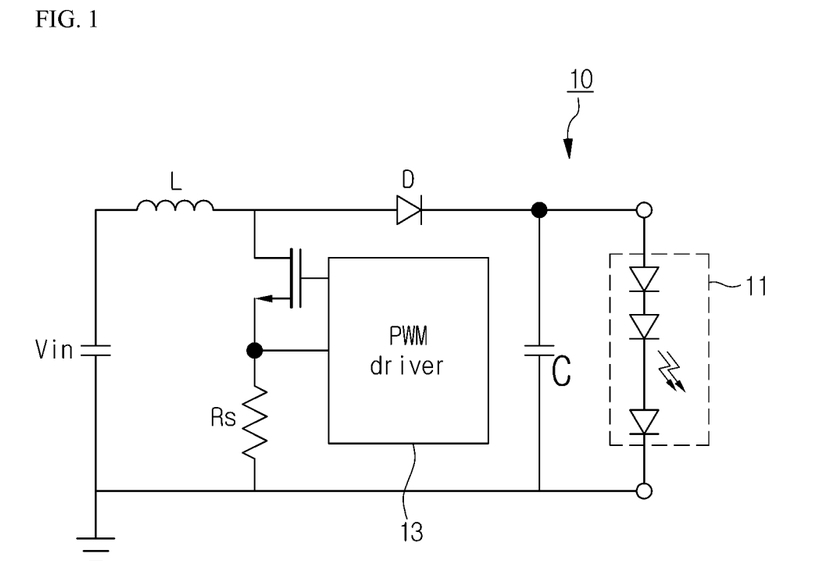
FIG. 1 is a circuit diagram illustrating an LED protection circuit according to the related art.

When an LED backlight employing light emitting diodes (LEDs) uses a plurality of LEDs connected with each other in series, the LED backlight needs a driving circuit which can provide a constant current to the LEDs and a dimming circuit which can allow a user to arbitrarily control a luminance and the color temperature or to control a luminance of the LEDs to compensate for the temperature and the like. FIG. 1 shows a circuit diagram illustrating an LED driving circuit of the related art.

FIG. 1 is a circuit diagram illustrating one example of an LED driving circuit employing a conventional boost type DC-DC converter. As depicted in FIG. 1, in the LED driving circuit employing the conventional boost type DC-DC converter, an inductor L and a diode D are connected in series to a positive (+) terminal of a direct current source Vin, and a capacitor C and an LED array 11 are connected between the diode and a negative (-) terminal of the direct current source Vin in parallel to each other. A switch 12 and a voltage detection resistor Rs are connected in series between the connection node of the inductor L and the diode D and the negative (-) terminal of the direct current source Vin. A voltage value detected from the voltage detection resistor Rs is input to a PWM driver 13 and the PWM driver 13 controls an on-off duty ratio of the switch 12 according to a detected voltage value. As depicted in FIG. 1, a MOSFET may be used as the switch 2 by controlling a gate voltage of the MOSFET.

When the switch 12 is turned on, a current provided from the direct current source Vin flows through the inductor L and a switch S, such that energy is stored in the inductor L. When the switch 12 is turned off, a sum of the direct current source Vin and the stored energy of the inductor L is transferred to the LED array 11 through the diode D. At this time, a voltage transferred to the LED array 11 is smoothed by a smoothing capacitor C, such that a value of the voltage is equal to or greater than that of an input voltage Vin.

In such an LED driving circuit 10 employing a conventional boost type DC-DC converter, a luminance control of the LED array 11 is performed by controlling a resistance value of the resistor Rs to control a voltage value detected from the voltage detection resistor Rs. Although such a conventional luminance control can be performed by using a variable resistor as the voltage detection resistor Rs, since a wattage resistor must be used as the voltage detection resistor Rs due to a great LED resistance, there is a problem that it is not easy to control the voltage variation. Further, when the plurality of LEDs for generating various colors are used, different driving circuits are used for each LED color, so values of the voltage detection resistor Rs varies for each driving circuit, causing a bad influence upon a luminance adjustment, a color coordinate control, and uniformity.

Further, in the LED driving circuit 10 employing the boost type DC-DC converter, when the LED module 11 is open or a load is out of order, a current input to the LED module 11 is increased so that the module may be damaged. Therefore, an over-current protection circuit for an LED driving circuit has been essentially demanded.

SUMMARY

In implementing an LED lighting power driver, an LED protection circuit according to an embodiment can re-initiate an LED lighting at a current below an allowable current of the LED module using a circuit which includes a one-shot vibrator in order to protect the LED module from an over-current phenomenon in a hotwiring situation in which an LED module having a high constant voltage (CV) and a low forward drop voltage ($V_f$) is connected.

An LED protection circuit according to the embodiment includes an LED module; an LED load-open detection circuit for detecting a voltage applied to the LED module to vary a reference potential; a latch circuit for maintaining a latch state according to the reference potential of the LED load-open detection circuit; a current limit circuit for receiving an output signal from the latch circuit to output a first signal; an LED load connection detection circuit for varying the reference potential through the first signal to output a second signal; a trigger input circuit connected to the LED load connection detection circuit for outputting a third signal using the second signal; and a one-shot vibrator for outputting a fourth signal of a square waveform during a predetermined time when the third signal is input.

According to the LED protection circuit of the embodiment, in implementing an LED lighting power driver, the LED protection circuit can re-initiate an LED lighting at a current below an allowable current of the LED module using a circuit which includes a one-shot vibrator in order to protect the LED module from an over-current phenomenon in a hotwiring situation in which an LED module having a high constant voltage (CV) and a low forward drop voltage ($V_f$) is connected.

DETAILED DESCRIPTION OF THE EMBODIMENTS

Hereinafter, an exemplary embodiment of the disclosure will be described with reference to accompanying drawings. The details of other embodiments are contained in the following detailed description and accompanying drawings. The advantages and features of the disclosure, and the method of accomplishing the advantages and features of the disclosure will be apparent through the following description together with accompanying drawings. The same reference numerals will be assigned to the same elements.

Figure 2:
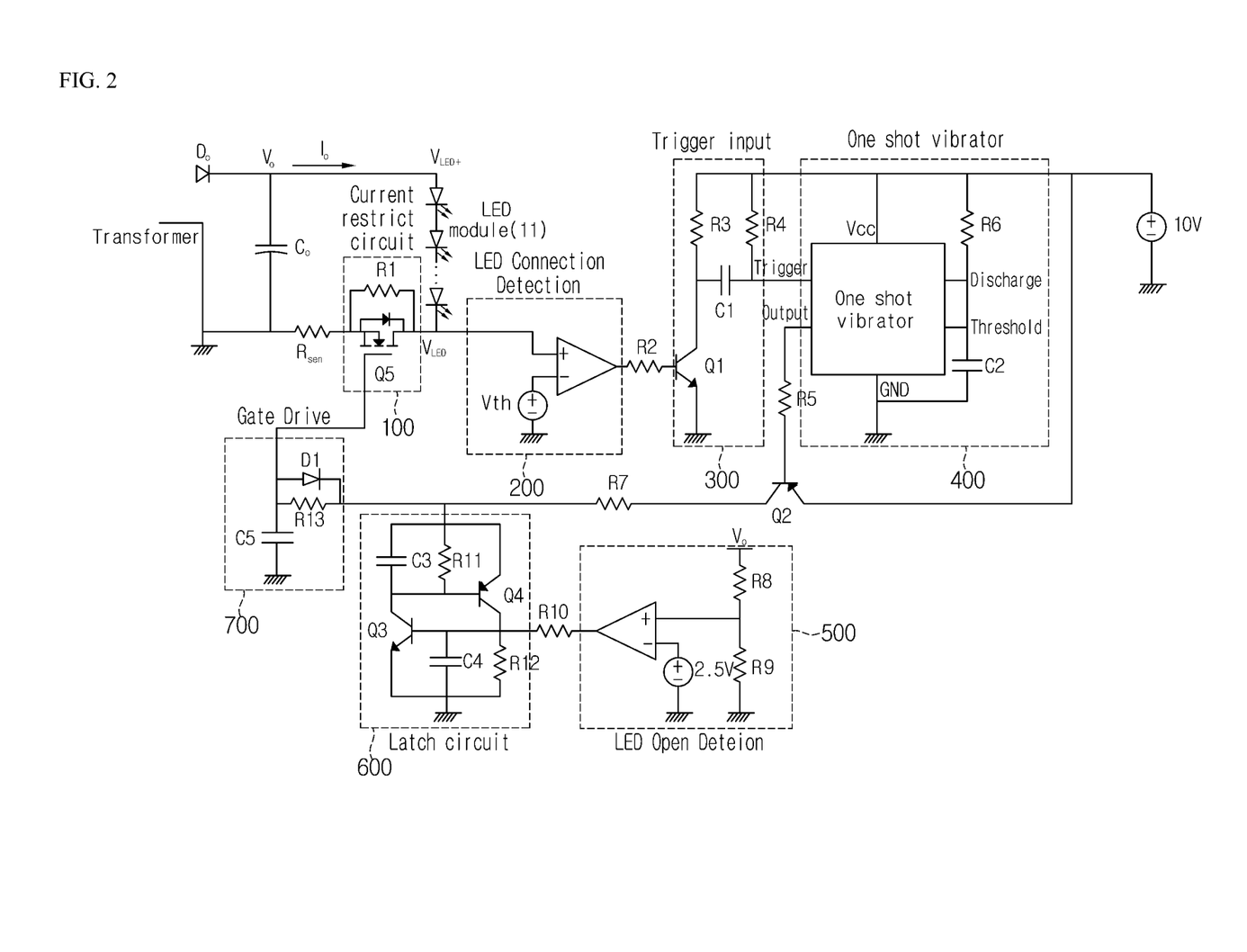
FIG. 2 is a circuit diagram illustrating an LED protection circuit according to the embodiment.

An LED protection circuit according to an embodiment includes an LED module 11; an LED load-open detection circuit 500 for detecting a voltage applied to the LED module 11 to vary a reference potential; a latch circuit 600 for maintaining a latch state according to the reference potential of the LED load-open detection circuit 500; a current limit circuit 100 for receiving an output signal from the latch circuit 600 to output the first signal; an LED load connection detection circuit 200 for varying the reference potential through the first signal to output the second signal; a trigger input circuit 300 connected to the LED load connection detection circuit 200 for outputting the third signal using the second signal; a one-shot vibrator 400 for outputting the fourth signal of a square waveform during a predetermined time when the third signal is input; and a gate driver 700 formed between the current limit circuit 100 and the latch circuit 600 for slowly driving a MOS field-effect transistor included in the current limit circuit 100.

The current limit circuit 100 includes the first resistor R1 and the fifth transistor Q5 which are connected in parallel to each other. One terminal of the first resistor R1 is connected to a voltage detection resistor Rs, and the other terminal of the first resistor R1 is connected to the LED module 11. A signal of the gate driver 700 may be input to the gate terminal of the fifth transistor Q5. The LED module 11 may include a plurality of light emitting diodes connected in series. The current limit circuit 100 is connected to the last cathode terminal of the LED module 11.

A voltage of the current limit circuit 100 and the LED module 11 may be input to a comparator of the connection detection circuit 200. The voltage of the current limit circuit 100 and the LED module 11 may be input to the positive terminal of the comparator included in the connection detection circuit 200. In addition, a threshold voltage Vth may be input to the negative of the comparator.

An output signal of the connection detection circuit 200 may be input to the trigger input circuit 300. The second resistor R2 may be formed between the trigger input circuit 300 and the connection detection circuit 200. The trigger input circuit 300 may include the first transistor Q1, the third resistor R3, the fourth resistor R4, and the first capacitor C1. The base terminal of the first transistor Q1 may be connected to the second resistor R2, and the emitter terminal thereof is grounded. One terminal of the third resistor R3 may be connected to the collector terminal of the first transistor Q1. One terminal of the first capacitor C1 may be connected to the third resistor R3, and the other terminal of the first capacitor C1 may be connected to one terminal of the fourth resistor R4. The other terminal of the fourth resistor R4 may be connected to the other terminal of the third resistor R3.

The other terminal of the first capacitor C1 may be input to the one-shot vibrator 400 as a trigger signal. An output of the one-shot vibrator 400 may be connected to one terminal of the fifth resistor R5, and the other terminal of the fifth resistor R5 may be connected to the base of the second transistor Q2.

The second transistor Q2 may be a PNP type. The voltage of 10 V may be input to the emitter of the second transistor Q2. One terminal of the seventh resistor R7 may be connected to the collector terminal of the second transistor Q2, and the other terminal of the seventh resistor R7 may be connected to the latch circuit 600 and the gate driver 700.

In the latch circuit 400, the third capacitor C3 and the eleventh resistor R11 may be connected in parallel to each other. One terminal of the third capacitor C3 and one terminal of the eleventh resistor R11 may be connected to the other terminal of the seventh resistor R7 and the emitter terminal of the fourth transistor Q4. The other terminals of the third capacitor C3 and the eleventh resistor R11 are connected to the base terminal of the fourth transistor Q4 and the collector terminal of the third transistor Q3. The emitter terminal of the third transistor Q3 is grounded.

One terminal of the twelfth resistor R12 is connected to the collector terminal of the fourth transistor Q4, and the other terminal of the twelfth resistor R12 is grounded. The twelfth resistor R12 and the fourth capacitor C4 are connected in parallel to each other. One terminal of the twelfth resistor R12 and one terminal of the fourth capacitor C4 are connected to the base terminal of the third transistor Q3, and the other terminals of the twelfth resistor R12 and the fourth capacitor C4 are grounded.

One terminal of the tenth resistor R10 is connected to the base terminal of the third transistor Q3, and the other terminal of the tenth resistor R10 is connected to an output terminal of the LED load-open detection circuit 500. The LED load-open detection circuit 500 includes a comparator. The voltage of 2.5 V is input to the negative terminal of the comparator. A fraction voltage by voltage-dividing an output voltage Vo is input to the positive terminal of the comparator. Concerning the voltage division, one terminal of the eighth resistor R8 is connected to the output voltage Vo, and the other terminal of the eighth resistor R8 is connected to one terminal of the ninth resistor R9. In addition, the other terminal of the ninth resistor R9 is grounded.

As depicted in the drawings, the other terminal of the seventh resistor R7 may be connected to the latch circuit 600 and the gate driver 700. One terminal of the thirteenth resistor R13 and one terminal of the first diode D1, which are included in the gate driver 700 and connected in parallel to each other, may be connected to the other terminal of the seventh resistor R7. Further, the other terminals of the thirteenth resistor R13 and the first diode D1 is connected to one terminal of the fifth capacitor C5. The other terminal of the fifth capacitor C5 is grounded. One terminal of the fifth capacitor C5 is connected to the gate terminal of the fifth transistor Q5 included in the current limit circuit 100.

Figure 3:
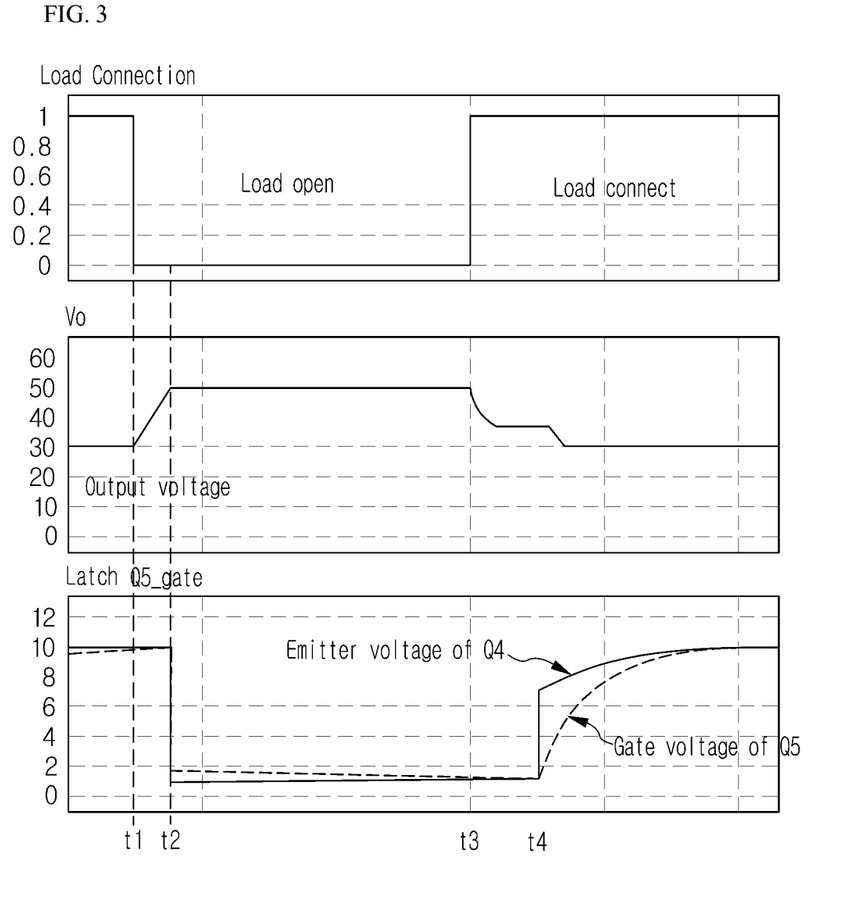
FIG. 3 is graphs illustrating voltages at each time point as a function of time when the LED module is open in a normal operation state.

FIG. 3 is graphs illustrating voltages at each time point over time when the LED module 11 is open in the normal operation state.

The circuit is operated in the normal operation state before time point t1. Thus, the LED module 11 is connected and an output capacitor $C_0$ maintains a constant voltage, such that the output voltage Vo is maintained at the constant voltage.

In the first waveform of FIG. 3, '0' means the state that the LED module 11 is open, and '1' means the state that the LED module 11 is connected. When the LED module 11 is open in the normal operation state, energy is transferred from a transformer to the output capacitor $C_0$, and since the LED module 11 is open so that the output current is 0 (zero), the output voltage Vo is increased. When the output voltage is increased approximately at a CV control voltage at time point t2, the output of the comparator of the connection detection circuit 200 becomes high, such that the latch circuit 600 is operated.

When the latch circuit 600 is operated, $V_{be}$ of the third transistor Q3 is increased such that the third transistor Q3 is conducted, and as the third capacitor C3 is charged, the fourth transistor Q4 is also conducted, such that the voltage of the emitter terminal of the fourth transistor Q4 is maintained at about 0.7 V to 0.8 V. As described above, since the latch state can be maintained when the LED module 11 is open even if an output of the comparator varies according to the output voltage $V_o$, the voltage of the emitter terminal of the fourth transistor Q4 can be maintained at about 0.7~0.8 V, so the malfunction is prevented. The latch circuit 600 is reset when an electric power supplied to the latch circuit 600 is turned off.

As shown in the graph, when the LED module 11 is connected at time point t3, the voltage of the output capacitor Co is decreased over time. When a high voltage is applied to the gate driver 700, the gate driver 700 slowly increases a voltage of the gate terminal of the fifth transistor Q5 through an RC filter R13 and C5 to slowly decrease a conductive resistance of the fifth transistor Q5, and when a low voltage is applied to the gate driver 700, the gate driver 700 rapidly decreases the voltage of the gate terminal of the fifth transistor Q5.

As depicted in FIG. 3, although the LED module 11 is connected at time point t3 through the above operation, the voltage of the emitter terminal of the fourth transistor Q4 is not rapidly increased from 0.7 V to 0.8 V and the voltage of the gate terminal of the fifth transistor Q5 is slowly increased so that an over-current can be prevented.

Figure 4:
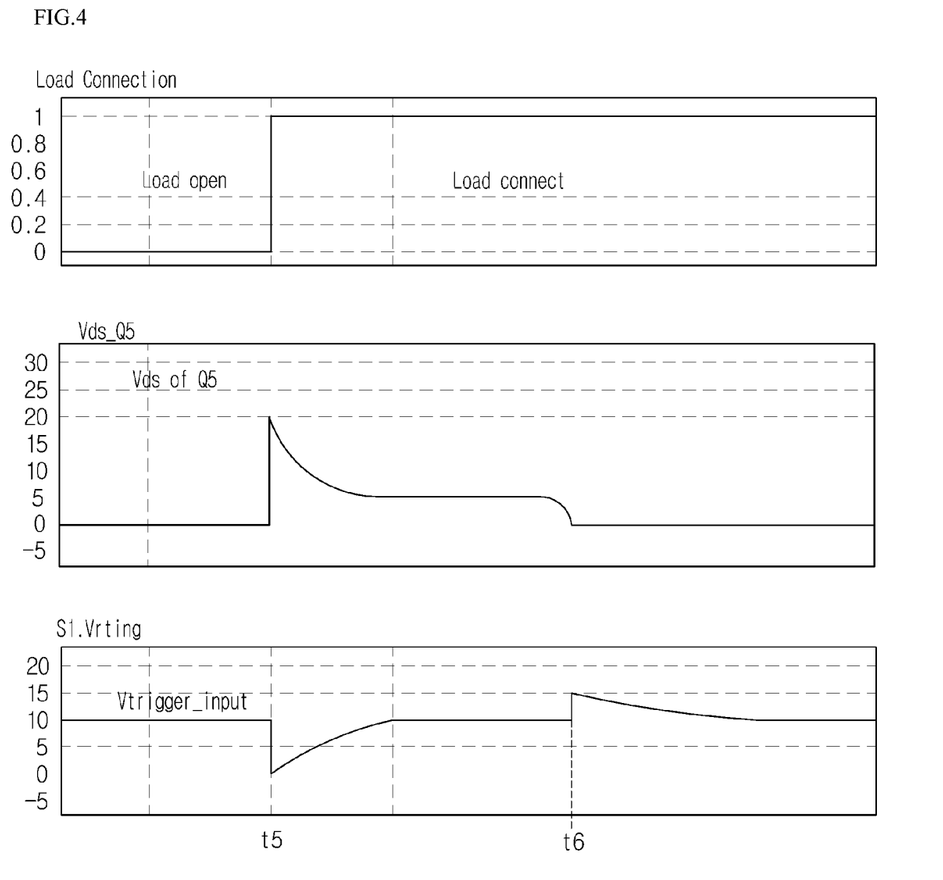
FIGS. 4 and 5 are graphs illustrating a voltage at each time point as a function of time when the LED module is connected in an open state.
Figure 5:
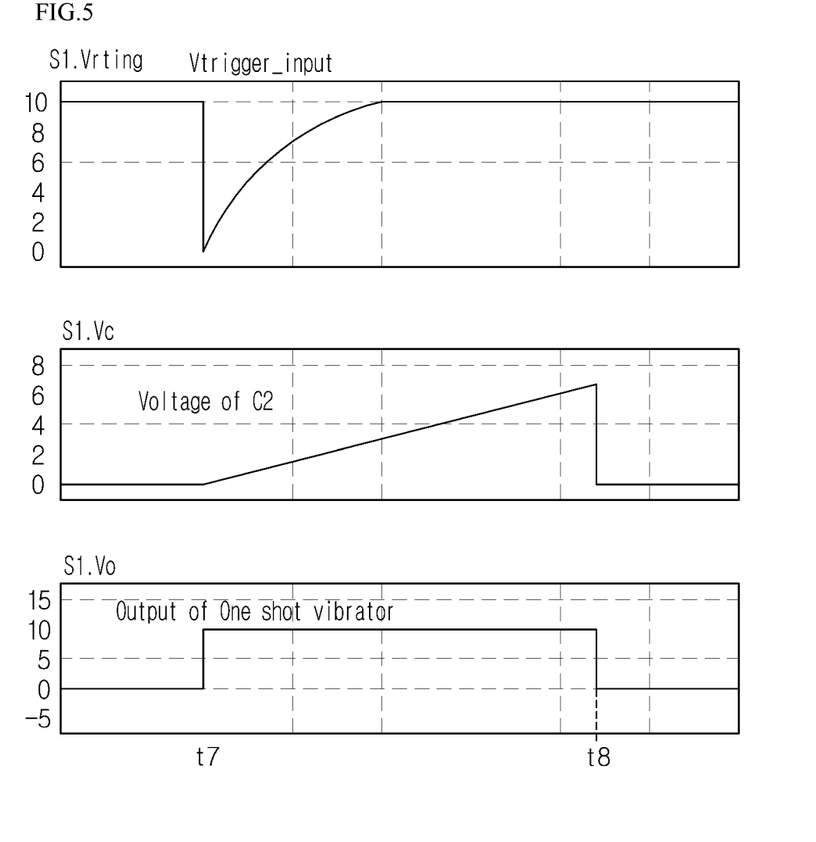

FIGS. 4 and 5 are graphs illustrating a voltage at each time point as a function of time when the LED module 11 is connected in an open state.

When the LED module 11 is connected at time point t5, since the fifth transistor Q5 is in a turned off state, the current output from the LED module 11 flows through the first resistor R1, such that a peak current is limited by $(V_o-V_f)/R1$. A potential difference of $(V_o-V_f)$ is generated between both terminals of the first resistor R1 by a current flowing through the first resistor R1 so that the output of the comparator is changed from a low to a high.

If the output of the comparator is changed from the low to the high, a trigger input voltage of the trigger input circuit 300 is immediately changed from a high state to a low state and then, is increased to be in the high state according to a time constant of an RC circuit. After the fifth transistor Q5 is saturated, $V_{LED}$ is less than $V_{th}$ such that the first transistor Q1 is turned off and the first capacitor C1 is discharged. Thus, the trigger voltage is maintained at a high.

When a pulse type of a low voltage is input to the trigger terminal, a voltage of the second capacitor C2 of the one-shot vibrator 400 is increased to ⅔Vcc and then discharged to 0 V again after arriving at ⅔Vcc. While the second capacitor C2 is being charged, a high is output in a square waveform from the output terminal. The charging time of the second capacitor C2 may be controlled according a capacitance of the second capacitor C2 and the sixth resistor R6.

If a voltage of the output terminal of the one-shot vibrator 400 becomes high, the second transistor Q2 is turned off, such that electric power supplied to the latch circuit is shut off. Thus, the latch circuit 600 is reset and the fifth transistor Q5 is turned on again, such that a normal constant current control is performed.

Figure 6:
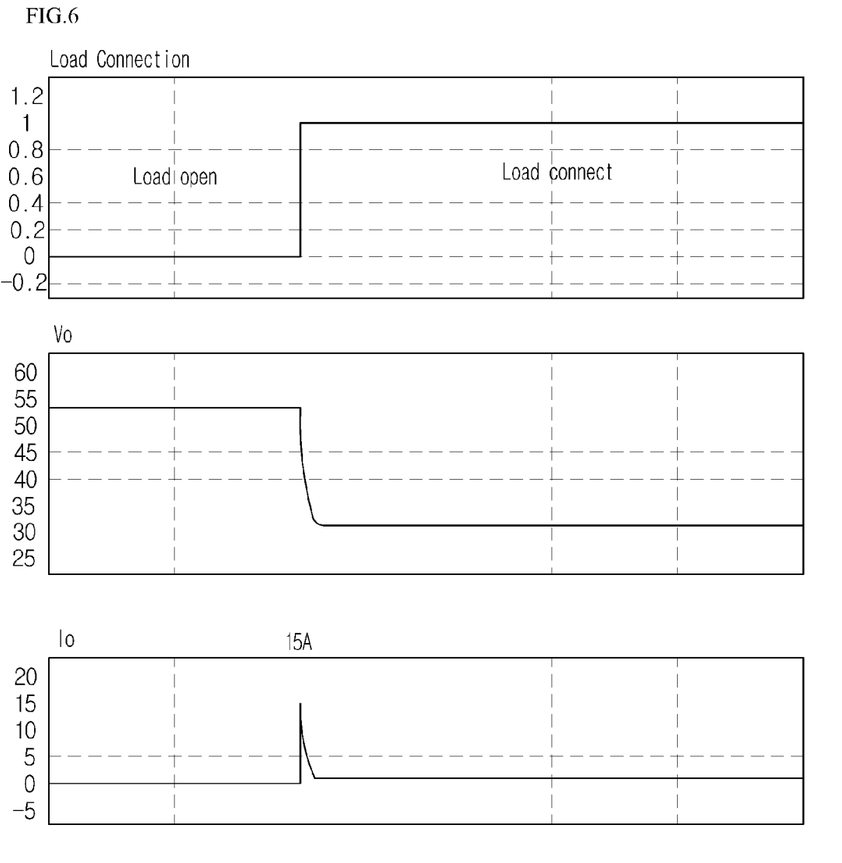
FIGS. 6 and 7 are graphs illustrating current values of a circuit according to an embodiment and a protection circuit according to the related art.
Figure 7:
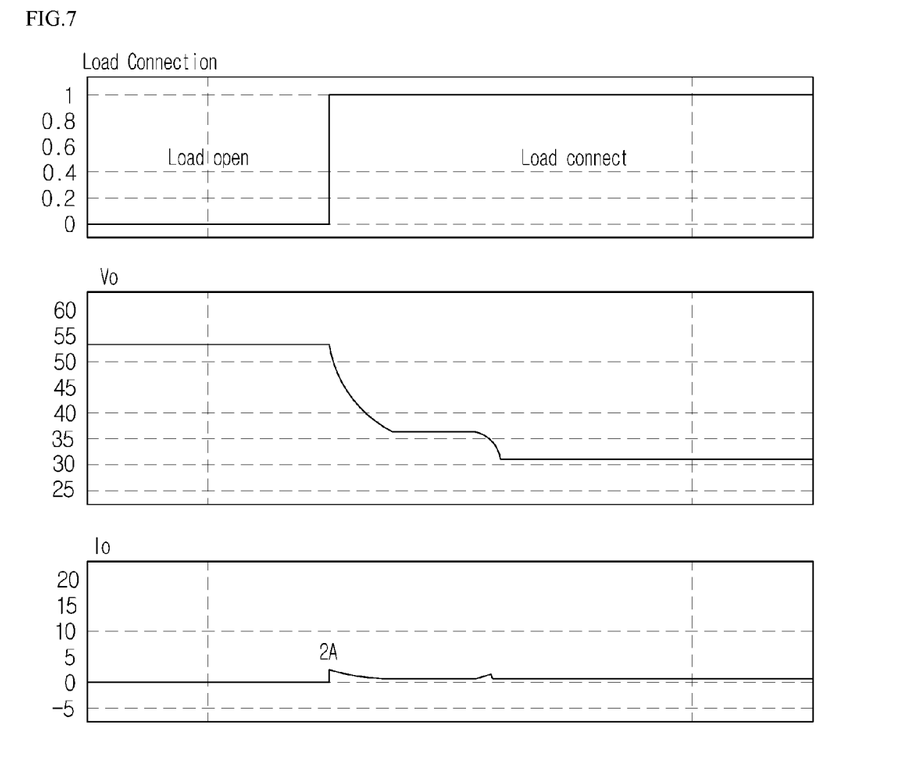

FIGS. 6 and 7 are graphs illustrating current values of a circuit according to an embodiment and a protection circuit according to the related art. As a simulation condition, a voltage detection resistance is 0.47Ω, $V_f$ is 30 V, CV control voltage is 53 V, and an equivalent resistance $R_{on\_eq}$ is 1Ω. FIG. 6 is a graph before application of the protection circuit, and FIG. 7 is a graph when a protection circuit of the embodiment is applied.

The '0' in the first waveform from an upper portion denotes a state that the LED module is open and '1' denotes a state that the LED module is connected. The second waveform denotes an output voltage. And the third waveform denotes a current flowing through the LED module 11.

It is confirmed from FIG. 6 that when the LED module 11 is connected without any protection circuits, an output current flows at its maximum current of 15 A. However, in FIG. 7, when the LED module 11 is connected through a protection circuit, an output current flows to the maximum current of 2 A. Thus, it is confirmed that the current is limited in a hot-wiring situation.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effects such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An LED protection circuit comprising:
an LED module;
an LED load-open detection circuit for detecting a voltage applied to the LED module to vary a reference potential;
a latch circuit for maintaining a latch state according to the reference potential of the LED load-open detection circuit;
a current limit circuit for receiving an output signal from the latch circuit to output a first signal;
an LED load connection detection circuit for varying the reference potential through the first signal to output a second signal;
a trigger input circuit connected to the LED load connection detection circuit for outputting a third signal using the second signal; and
a one-shot vibrator for outputting a fourth signal of a square waveform during a predetermined time when the third signal is input.

2. The LED protection circuit of claim 1, further comprising:
a gate driver formed between the current limit circuit and the latch circuit for slowly driving a MOS field-effect transistor included in the current limit circuit.

3. The LED protection circuit of claim 2, wherein the current limit circuit includes a first resistor and a fifth transistor connected in parallel to each other, and one terminal of the first resistor is connected to the LED module.

4. The LED protection circuit of claim 3, wherein the current limit circuit is connected to a last cathode terminal of the LED module.

5. The LED protection circuit of claim 3, wherein the fifth transistor has a gate terminal to which an output signal of the gate driver is input.

6. The LED protection circuit of claim 1, wherein the trigger input circuit includes a first transistor, a third resistor, a fourth resistor, and a first capacitor, a base terminal of the first transistor is connected to the LED load connection detection circuit, and an emitter terminal of the first transistor is grounded.

7. The LED protection circuit of claim 6, wherein a collector terminal of the first transistor is connected to one terminal of the third resistor, one terminal of the capacitor is connected to one terminal of the third resistor, an opposite terminal of the capacitor is connected to one terminal of the fourth resistor, and an opposite terminal of the fourth resistor is connected to an opposite terminal of the third resistor.

8. The LED protection circuit of claim 1, wherein the latch circuit includes a third capacitor and an eleventh resistor which are connected in parallel to each other, and one terminals of the third capacitor and the eleventh resistor are connected to an emitter terminal of a fourth transistor included in the latch circuit.

9. The LED protection circuit of claim 8, wherein opposite terminals of the third capacitor and the eleventh resistor are connected to both of a base terminal of the fourth transistor and a collector terminal of a third transistor included in the latch circuit.

10. The LED protection circuit of claim 9, wherein an emitter terminal of the third transistor is grounded.

11. The LED protection circuit of claim 8, wherein a collector terminal of the fourth transistor is connected to one terminal of a twelfth resistor and an opposite terminal of the twelfth resistor is grounded.

12. The LED protection circuit of claim 11, wherein the twelfth resistor and a fourth capacitor are connected in parallel to each other, one terminals of the twelfth resistor and the fourth capacitor are connected to a base terminal of a third transistor, and opposite terminals of the twelfth resistor and the fourth capacitor are grounded.

13. The LED protection circuit of claim 2, wherein opposite terminals of a thirteenth resistor and a first diode included in the gate driver are connected to one terminal of a fifth capacitor, and an opposite terminal of the fifth capacitor is grounded.

14. The LED protection circuit of claim 13, wherein one terminal of the fifth capacitor is connected to a gate terminal of a fifth transistor included in the current limit circuit.

* * * * *